April 17, 1956     L. D. COBB     2,742,332
BEARINGS AND LUBRICATION THEREFOR
Filed March 28, 1952     2 Sheets-Sheet 1

INVENTOR;
LELAND D. COBB
BY Edward H. Goodrich
HIS ATTORNEY.

April 17, 1956  L. D. COBB  2,742,332
BEARINGS AND LUBRICATION THEREFOR
Filed March 28, 1952  2 Sheets-Sheet 2

INVENTOR;
LELAND D. COBB
BY Edward H. Goodrich
HIS ATTORNEY

United States Patent Office 2,742,332
Patented Apr. 17, 1956

2,742,332

BEARINGS AND LUBRICATION THEREFOR

Leland D. Cobb, Forestville, Conn., assignor to General Motors Corporation, Detroit, Mich., a corporation of Delaware Application March 28, 1952, Serial No. 279,082

18 Claims. (Cl. 308—187)

This invention relates to the lubrication of bearings and particularly to a separator for rolling elements which provides for emergency bearing lubrication.

It has been common practice for many years to sealingly close the ends of antifriction bearings, as ball bearings, so that the required amount of lubricant is retained in the bearings and dirt, water and other deleterious material is prevented from entering the bearings. A sufficient but small volume of lubricant of required consistency in such a bearing is a major factor in controlling bearing life. Ball bearings used in aircraft engines and in other machinery when subjected to unexpected and very heavy duty overloads beyond the intended bearing capacity may suddenly overheat and use up their small volume of sealed-in lubricant. Frequent over-heating of bearings for short periods may cause oxidation of this bearing lubricant and break down of the lubricant with the result that the lubricant gradually congeals to hard tar-like non-lubricating deposits in the path of the rolling elements impeding bearing operation and producing further bearing heating with consequent bearing failure unless more lubricant is added.

It is an object of this invention to provide for the rolling elements of an antifriction bearing an improved separator arranged to add lubricant to the bearing when the bearing overheats.

Another object of this invention is to provide in an antifriction bearing an improved separator which will deposit within the bearing a measured volume of added lubricant when the bearing heats to a predetermined temperature.

Another object is to provide an improved separator having replaceable lubricant containers for emergency lubrication.

A further object is to provide in an improved separator an emergency lubricating system which indicates when the lubricating system has operated.

To these ends and also to improve generally upon devices of this character, this invention consists in the various matters hereinafter described and claimed. In its broader aspects, the invention is not necessarily limited to the specific structures selected for illustrative purposes in the accompanying drawings wherein Figure 1 is a diametrical cross section of one form of the improved separator.

Figure 1:
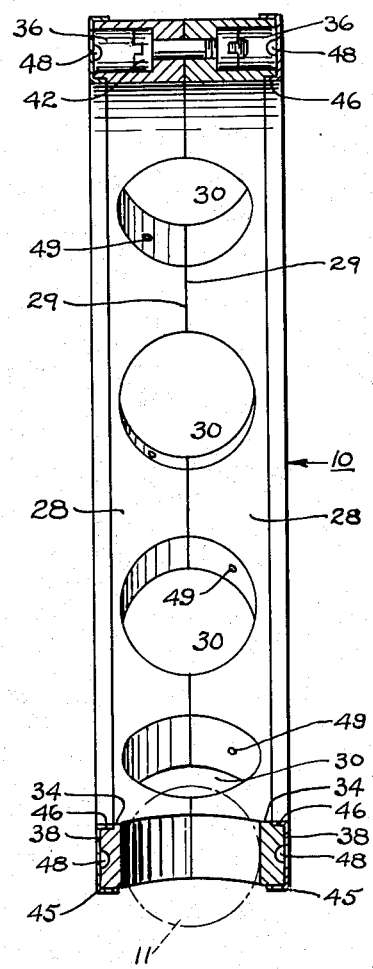
Figure 2:
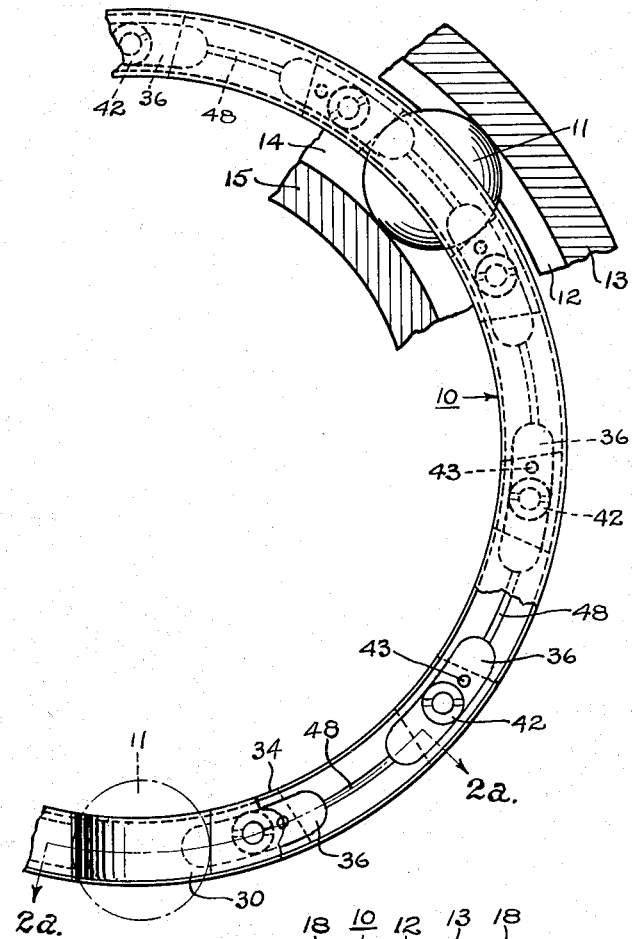
Figure 2 is a fragmentary side elevation showing the separator of Figure 1 in operative position.
Figure 2A:
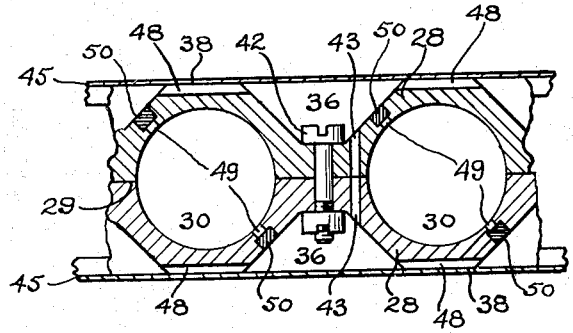
Figure 2a is a framentary section taken along the line 2a—2a of Figure 2.
Figure 3:
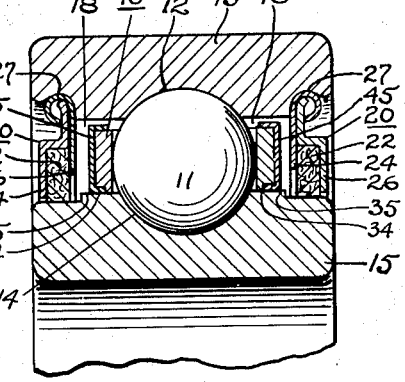
Figure 3 is a fragmentary view in axial section showing a sealed ball bearing equipped with the separator of Figure 1.

My improved separator is provided with a supply of emegency lubricant which is automatically released to provide additional lubrication as well as replenishment of lubricant in an antifriction bearing when it starts to overheat. This improved separator, as 10, is shown applied to rolling elements in the form of balls 11 arranged to roll in a raceway 12 of an outer race ring 13 and in a raceway 14 of an inner race ring 15. The ends of an annular lubricant chamber 18 between these race rings and surrounding the separator are closed by suitable seals 20 to retain lubricant within the bearing and to exclude dirt and other deleterious materials from entering the bearing. Each seal 20 preferably comprises a felt sealing washer 22 in sealingly wiping engagement with a cylindrical surface of the inner race ring 15 and held between annular sheet metal shields 24 and 26, one of these shields, as 26, being folded over the periphery of the other shield and tightly seated in sealing engagement with the walls of an annular groove 27 in the outer race ring.

The separator 10 has a pair of similar halves comprising annular body members 28 abutting along flat inner faces 29 and cooperatively providing peripherally spaced ball pockets 30 herein shown as cylindrical and extending radially through the separator. One of the cylindrical separator walls as the wall 34 lightly rides in the presence of bearing lubricant upon a cylindrical periphery 35 of one of the race rings. However, if desired, the separator may be supported in spaced relation to the race rings 13 and 15 by parti-spherically forming the ball pockets to loosely embrace the balls 11. Corresponding opposed lubricant wells 36, containing emergency fluid lubricant, extend towards each other between the ball pockets 30 and inwardly from outer flat annular walls 38 of the separator halves. Bolts 42 extend through the separator from within these opposed lubricant wells 36 to secure the separator halves 28 together as a unit. Communicating transverse lubricant passages 43 provide for the flow of lubricant between each pair of opposed wells 36.

An annular cap 45, channel-shaped in cross section, is demountably pressed into tightly sealing relation over and against the outer end of each body member 28. When one of the peripheral separator walls, as 34, is to ride upon a race ring as shown, I preferably have an annular flanged portion 46 of each cap respectively fitted within annular notches in the members 28 so that these flanges will form smooth cylindrical extensions of the wall 34. Adjacent lubricant wells 36 at each side of the separator are interconnected by passages 48 formed by grooves cut in the outer walls 38. A passage 49 between each lubricant well 36 and an adjacent ball pocket 30 is normally closed by a fusible plug 50 pressed into a counterbore and arranged to melt only when the bearing overheats. During normal bearing operation, the emergency lubricant is retained within the wells 36 and the bearing is lubricated only by the lubricant within the annular lubricant chamber 18. When sudden overloads or abnormal bearing operation causes detrimental heating of the bearing above a danger point, the plugs 50 act as low temperature fuses which suddenly admit the emergency lubricant to the ball pockets thereby saving the bearing from probable failure. These plugs are composed of materials that melt at suitable predetermined low temperatures and may be formed from alloys of lead, tin, cadmium and bismuth arranged to melt at a detrimental bearing operating temperature, such, for example, as 300° F.

The emergency lubricant in the wells 36 preferably contains an oil soluble dye. After release of this emergency lubricant into the annular lubricant chamber 18, the discoloration formed by this dye at and about the wiping zone of the sealing washer 22 indicates that the emergency lubricant has been discharged into the bearing. During assembly, after one of the caps 45 has been pressed on, the separator is horizontally positioned on this cap and the wells 36 are filled with lubricant after which the other cap 45 is pressed into position. After the plugs 50 have released the emergency lubricant, the bearing may be disassembled, new plugs 50 may be pressed into position and the separator may be reassembled with emergency lubricant in the wells 36.

Figure 4:
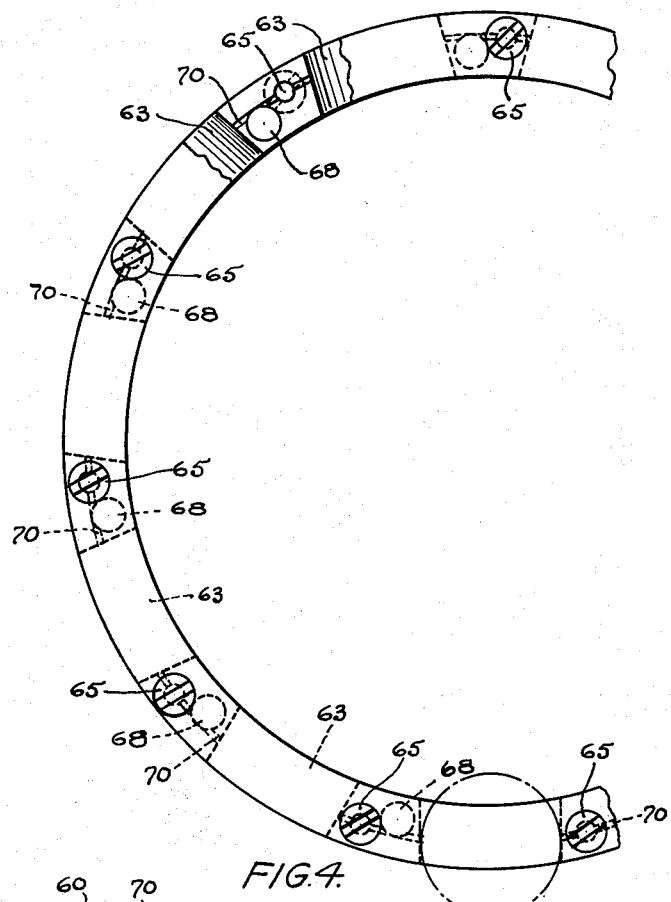
Figure 4 is a fragmentary side elevation of a modified separator.
Figure 5:
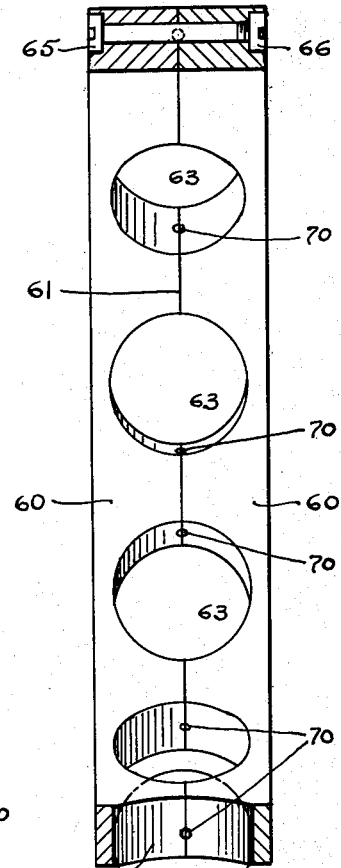
Figure 5 is a diametrical cross section of the separator of Figure 4.
Figure 6:
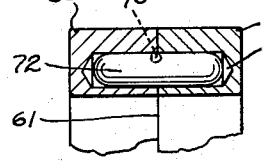
Figure 6 is a fragmentary view in axial section showing a lubricant-containing capsule in the separator of Figures 4 and 5.

In the embodiment of Figures 4, 5 and 6, a pair of similar annular separator halves 60 abut along their flat inner faces 61 and cooperatively provide a series of peripherally spaced ball pockets 63 generally corresponding to the ball pockets 30. Bolts 65 transversely extend through the separator between the pockets 63 and secure the separator halves together as a unit, the heads of these bolts and nuts 66 thereon preferably being received in counterbores. Between each pair of adjacent ball pockets 63 a pair of aligned blind end bores extend from the faces 61 part way across the separator and provide a lubricant well 68 that communicates with an adjacent ball pocket 63 through a passage 70 formed by corresponding grooves cut in the opposed faces 61 between adjacent ball pockets. During assembly of the separator halves, a sealed capsule 72 containing a predetermined volume of emergency fluid lubricant, as oil, is inserted in each lubricant well 68. These capsules are composed of gelatin or a suitable plastic which will melt and release the emergency supply of lubricant into the wells 68 and through passages 70 into the ball pockets when the bearing overheats above a predetermined detrimental bearing temperature due to overloading of the bearing, insufficient lubrication, or other causes. If desired, some of these capsules may be of a composition to melt at one temperature, for example 275° F., and others may be of compositions to melt at a higher or even at succeedingly higher temperatures. The oil in the capsules may contain a dye which will indicate at the seal 22 when the emergency lubricant has been discharged. When required, the bearing and separator may be taken apart and the discharged capsules replaced with lubricant filled capsules to provide for the next emergency lubrication of the bearing.

Figure 7:
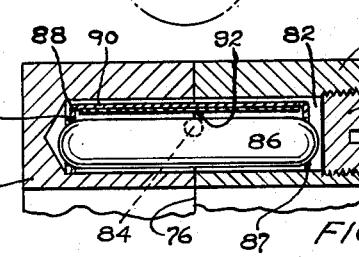
Figures 7, 7a, 8 and 9 are fragmentary views showing other capsule lubricating arrangements.
Figure 7A:
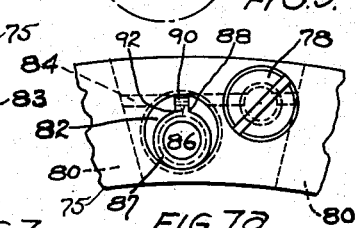

In the embodiment of Figures 7 and 7a, an annular separator, which may be supported in the same manner as is the separator 10, has two ring-shaped body members 74 and 75 provided with abutting flat inner faces 76 held together by bolts 78 respectively located between a series of peripherally spaced ball pockets 80, all in general accordance with the separator of Figures 4 and 5. A bore, forming an emergency lubricant well 82, extends partly across the separator between each pair of adjacent ball pockets and is normally closed at its outer end by a plug 83 removably threaded into one of the separator halves, as 75. Cooperating opposed grooves in the flat inner faces 76 form passages 84 from each lubricant well 82 to an adjacent ball pocket 80. A sealed capsule 86 containing a predetermined volume of emergency lubricant as oil, has its rounded ends demountably seated within the apertured ends 87 of a holder 88, these ends being generally annular and laterally extending from the ends of an arm 90 extending along one side of the capsule. The arm 90, which is preferably bimetallic throughout the major portion of its length, is composed of two sheets of metal secured together and having dissimilar coefficients of expansion. A piercing member 92 laterally projecting from an intermediate portion of the arm 90 has a sharp point normally spaced from the capsule 86 within the holder 88. The sheets of metal forming the arm 90 have such coefficients of expansion that they will laterally deform when the bearing overheats to a predetermined detrimental temperature causing each member 92 to pierce the adjacent capsule 86 thus releasing emergency lubricant to the bearing through the wells 82 and passages 84. The demountable plugs 83, which are accessible upon removal of a bearing seal, facilitate the withdrawal of a punctured capsule 86 and its holder 88 as a unit. It is convenient to employ the hooked end of a small tool under a holder end 87 in removing the holder and capsule. The pierced capsule is easily snapped out of its holder and replaced by a lubricant filled capsule and the capsule-holder assembly is thereafter placed in the lubricant well 82 which is then closed by its plug 83.

Figure 8:
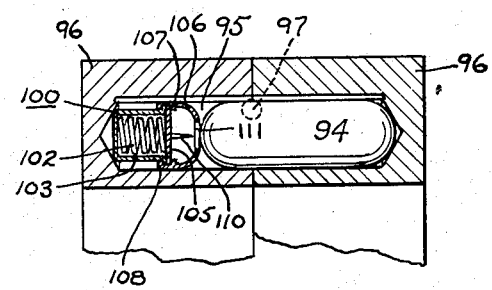

In the embodiment of Figure 8, a series of peripherally spaced lubricant-filled capsules 94 are demountably received in lubricant wells 95 between ball pockets circumferentially spaced in a pair of annular body members 96 cooperatively forming a separator, in general accordance with the showing of Figures 4 and 5. Lubricant passages 97 communicate between each well 95 and an adjacent ball pocket. A temperature responsive piercing unit 100, loosely and demountably received in one end of the well 95, has a coiled spring 102 compressed between the bottom of a cup-shaped container 103 and a cover plate 105 held across the container and against a container rim by a dome-shaped member or guard 106 having annular flanges 107, 108 respectively engaging the cover plate 105 and the container rim. A piercing member 110, projecting from the cover plate 105 in general alignment with a hole 111 in the member 106, is normally located within the dome-shaped member 106 and out of engagement with the capsule 94. Each member 106 is made from a low melting point alloy or the like which will melt when the bearing, due to overload, lack of lubricant or other causes, heats to a detrimental operating temperature whereupon the piercing member 110 under pressure from the spring will open the capsule and release emergency lubricant through the wells 95 and passages 97 to the bearing.

Figure 9:
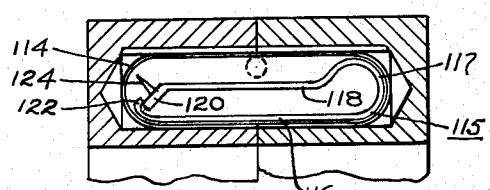

In the embodiment of Figure 9, lubricant wells corresponding to those in the separator of Figures 4 and 5 and communicating in the same manner with adjacent ball pockets, each demountably contain a sealed lubricant filled capsule 114 which contains its own piercing unit 115 that is preferably bent to form from resilient sheet metal. A longitudinal arm 116, lying against the major portion of the length of the inner wall of the capsule, is connected by a bent portion 117, generally conforming to a rounded end of the capsule, to a generally parallel spring arm 118 extending longitudinally of the capsule and spaced from the capsule walls. A bent-over end 120 of the arm 118 is releasably latched beneath the end of a bent-up lip 122 at the end of the arm 116, and a piercing member 124 mounted on the end 120 has its sharp point held from capsule engagement when the end 120 is latched under the lip 122. One or both arms 116, 118 are bimetallic and composed of bonded sheets of metal which have such different coefficients of expansion that one or both of these arms will laterally warp and release the latched relation of the end 120 and lip 122 when the bearing overheats to a predetermined detrimental temperature. The spring action of the unit 115 will then suddenly force the piercing member 124 through the end of the capsule thereby releasing the emergency lubricant from the capsule to the bearing. After discharge of emergency lubricant, the capsules 114 may be replaced with similar lubricant-filled capsules in the same manner as described with reference to Figures 4, 5 and 6.

I claim:

1. In a lubricating arrangement for an antifriction bearing having a plurality of rolling elements, an annular separator provided with spaced rolling element-receiving pockets and having a well for lubricant, said well being normally out of communication with the rolling elements, a wall between the well and one of the pockets and having a passage therethrough for providing communication between the well and one of the pockets, and temperature responsive means between the well and one end of said passage for releasing the lubricant from the well into one of said pockets when the bearing becomes overheated to a predetermined temperature.

2. In a lubricating arrangement for an antifriction bearing, an annular separator provided with spaced pockets for rolling elements, the separator having between a pair of said pockets a lubricant well containing fluid lubricant and having a passage extending from the well to one of said pockets, temperature responsive means for releasing lubricant from the well into said passage when the bearing overheats to a predetermined temperature, and color indicating means within said lubricant showing when lubricant has been released from the lubricant well to a rolling element receiving pocket.

3. In a lubricating arrangement for an antifriction bearing having rolling elements rotatably engageable with a pair of race rings within an annular lubricant chamber between the race rings, an annular separator having peripherally spaced pockets opening into the annular lubricant chamber and locating the rolling elements in circumferentially spaced relation and having peripherally spaced lubricant wells respectively located between adjacent pockets, the lubricant within said wells being normally sealed therein and normally out of communication with said pockets, a wall between each lubricant well and an adjacent pocket and having a lubricant passage therethrough which opens into the well and into the pocket, and temperature controlled means for releasing the lubricant from the wells and through said passages into the pockets in response to heating of the bearing to a predetermined temperature.

4. In a lubricating arrangement for an antifriction bearing, an annular separator provided with spaced pockets for rolling elements, the separator having between adjacent pockets a well for a supply of fluid lubricant, a wall between each pocket and the adjacent well, said wall having a passage extending from the well to one of said pockets, means independent of said passage and providing communication of lubricant between said pockets, a member adjacent to the entrance to each passage and normally sealing lubricant from flowing through the passage, and said member being temperature responsive to melt and release the flow of lubricant through the passage when the bearing overheats to a predetermined temperature.

5. In a lubricating arrangement for an antifriction bearing, an annular separator provided with spaced pockets for rolling elements, the separator being provided between adjacent pockets with a pair of spaced lubricant wells, the separator having a lubricant passage connecting the lubricant wells and having other lubricant passages respectively extending from said wells to one of said pockets, and means associated with each of said other passages normally preventing lubricant flow therethrough and arranged to melt at a predetermined temperature and admit lubricant to the bearing through said last mentioned passages when the bearing reaches a predetermined temperature.

6. In a separator arranged to provide lubricant for an antifriction bearing having rolling elements, an annular separator having a plurality of peripherally spaced pockets for said rolling elements and having spaced lubricant wells located between the pockets and opening at one side of said annular separator, an annular cap member secured to the separator and closing the open sides of the lubricant wells, the annular separator having a passage extending between adjacent lubricant wells, and temperature responsive means releasing lubricant from each lubricant well to one of the adjacent pockets when the separator is heated to a predetermined temperature.

7. In a separator arranged to provide lubricant for an antifriction bearing, an annular separator having a plurality of peripherally spaced pockets for rolling elements and having between each pair of adjacent pockets a pair of spaced lubricant wells opening respectively at the opposite sides of the separator, annular cap members demountably secured to the sides of the separator and sealingly closing the open sides of said wells, the annular separator having a passage extending between each pair of spaced lubricant wells and having passages extending respectively from each lubricant well to an adjacent pocket, fusible plugs normally sealing each of said last mentioned passages from lubricant flow therethrough, and said plugs being arranged to melt and release lubricant from the lubricant wells when the separator reaches an objectionable bearing operating temperature.

8. In a separator arranged to provide lubricant for an antifriction bearing, a pair of annular laterally abutting separator members secured in unit-handling relation and cooperatively providing a series of peripherally spaced rolling element-receiving pockets, each separator member having a series of lubricant wells respectively located between adjacent pockets and opening at an outer face of the separator member, annular cap members demountably fitting over the ends of the separator members and closing the open ends of said wells, the annular separator members cooperatively providing passages for flow of lubricant between both wells intermediate of each pair of adjacent pockets, each separator member having passages interconnecting adjacent lubricant wells and having passages respectively extending between each well and an adjacent pocket, and a fusible sealing plug in each of said last mentioned passages, the fusible plugs being arranged to melt and release lubricant from the lubricant wells when the separator is heated to a predetermined temperature.

9. In a lubricating arrangement according to claim 3, a sealed lubricant containing capsule in each well, and said temperature controlled means releasing the lubricant from the capsule into said wells.

10. In a lubricating arrangement according to claim 3, a lubricant-containing capsule in each well, and said capsule being composed of a material which melts at a temperature detrimental to operation of the bearing.

11. In a lubricating arrangement according to claim 3, a lubricant-containing capsule demountably received in each well, and said temperature controlled means including mechanism which punctures each capsule and releases the lubricant therefrom.

12. In a lubricating arrangement according to claim 2, a lubricant-containing capsule in said well, and said temperature responsive means releasing the lubricant from the capsule into the well in response to heating of the annular separator to a predetermined temperature.

13. In a lubricating arrangement according to claim 3 for providing an emergency supply of lubricant in an antifriction bearing, a sealed capsule containing a predetermined volume of lubricant demountably received in each well, and said capsule being composed of a material that will melt when heated to a predetermined temperature.

14. In a lubricating arrangement according to claim 3, a closed lubricant-containing capsule demountably received in each lubricant well, and said temperature controlled means including a piercing member which opens the capsule and releases lubricant therefrom.

15. In a lubricating arrangement according to claim 3, a lubricant-containing capsule demountably received in each well, a piercing member in each well associated with each capsule, spring means respectively urging the piercing members towards said capsules, and said temperature-controlled means normally retaining the piercing members in spaced relation with respect to their capsules and releasing the spring-urged piercing members at predetermined temperatures for piercing said capsules to release lubricant therefrom.

16. In a lubricating arrangement according to claim 3, a holder demountably received in each lubricant well, a lubricant-containing capsule demountably supported in each holder, the temperature controlled means including a temperature responsive arm on each holder, a piercing member responsive to each arm and normally spaced from a capsule, and said arms respectively deflecting under changes in temperature and forcing the piercing members into the capsules to release lubricant therefrom when the arms are heated to a predetermined temperature.

17. In a lubricating arrangement according to claim 3, a lubricant-containing capsule demountably received in each lubricant well, and said temperature controlled means including mechanism within each capsule including a spring pressed piercing member which punctures the capsule and releases lubricant therefrom when the capsule is heated to a predetermined temperature.

18. In a lubricating arrangement according to claim 3, a lubricant-containing capsule demountably received in each well, a capsule piercing member demountably received in each well and including a spring-pressed piercing member and a guard, the guard normally holding the piercing member from capsule engagement, and said temperature-controlled means including a responsive member on each guard which releases the spring-pressed piercing member into the capsule at a predetermined temperature.

References Cited in the file of this patent

UNITED STATES PATENTS

| | | |
|---|---|---|
| 731,978 | Tobin | June 23, 1903 |
| 1,390,717 | Keiper | Sept. 13, 1921 |
| 2,029,445 | Schubert | Feb. 4, 1936 |
| 2,566,494 | Leese | Sept. 4, 1951 |